INVENTOR
HANS HAGEDORN

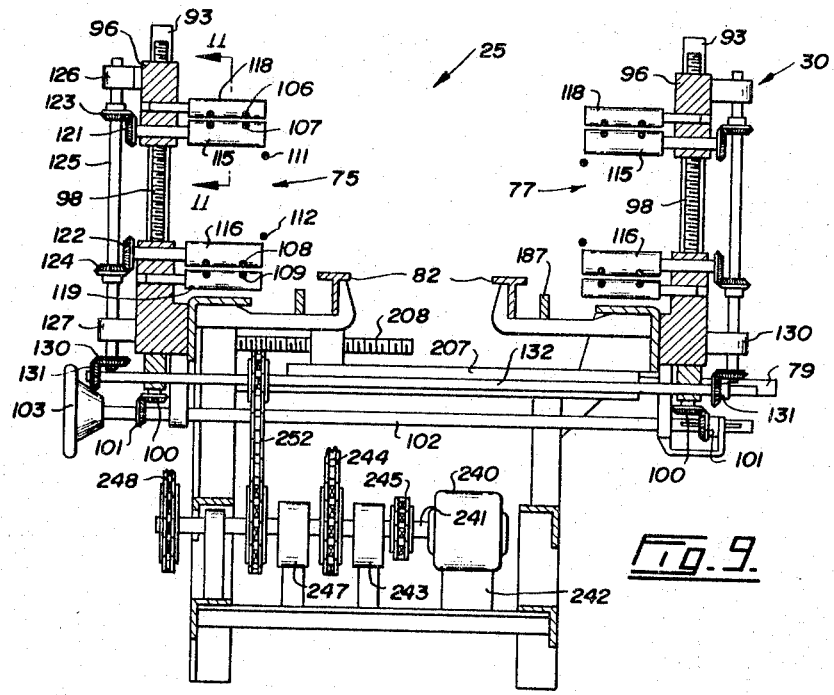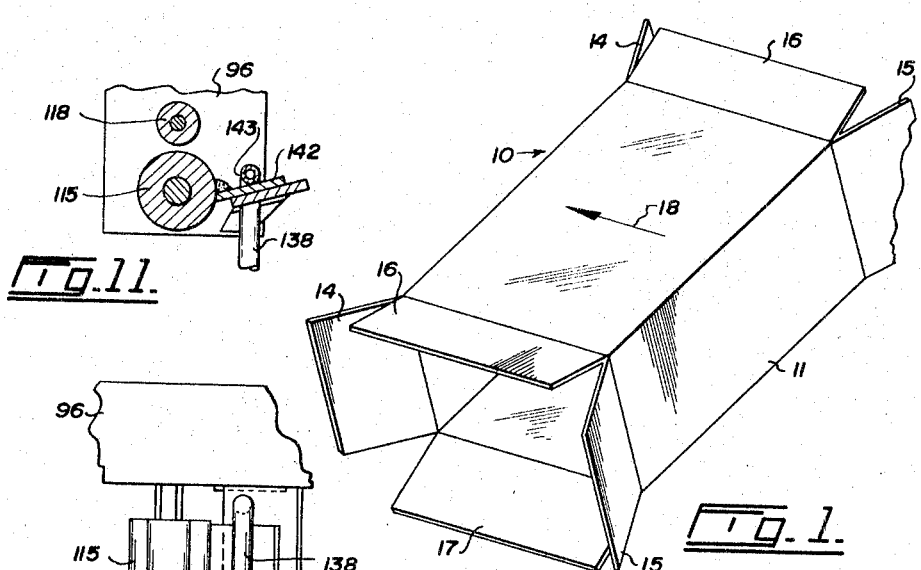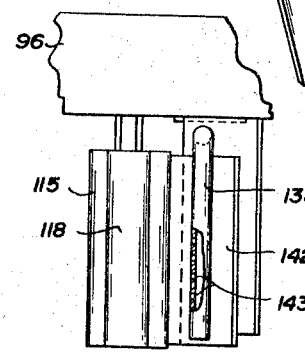

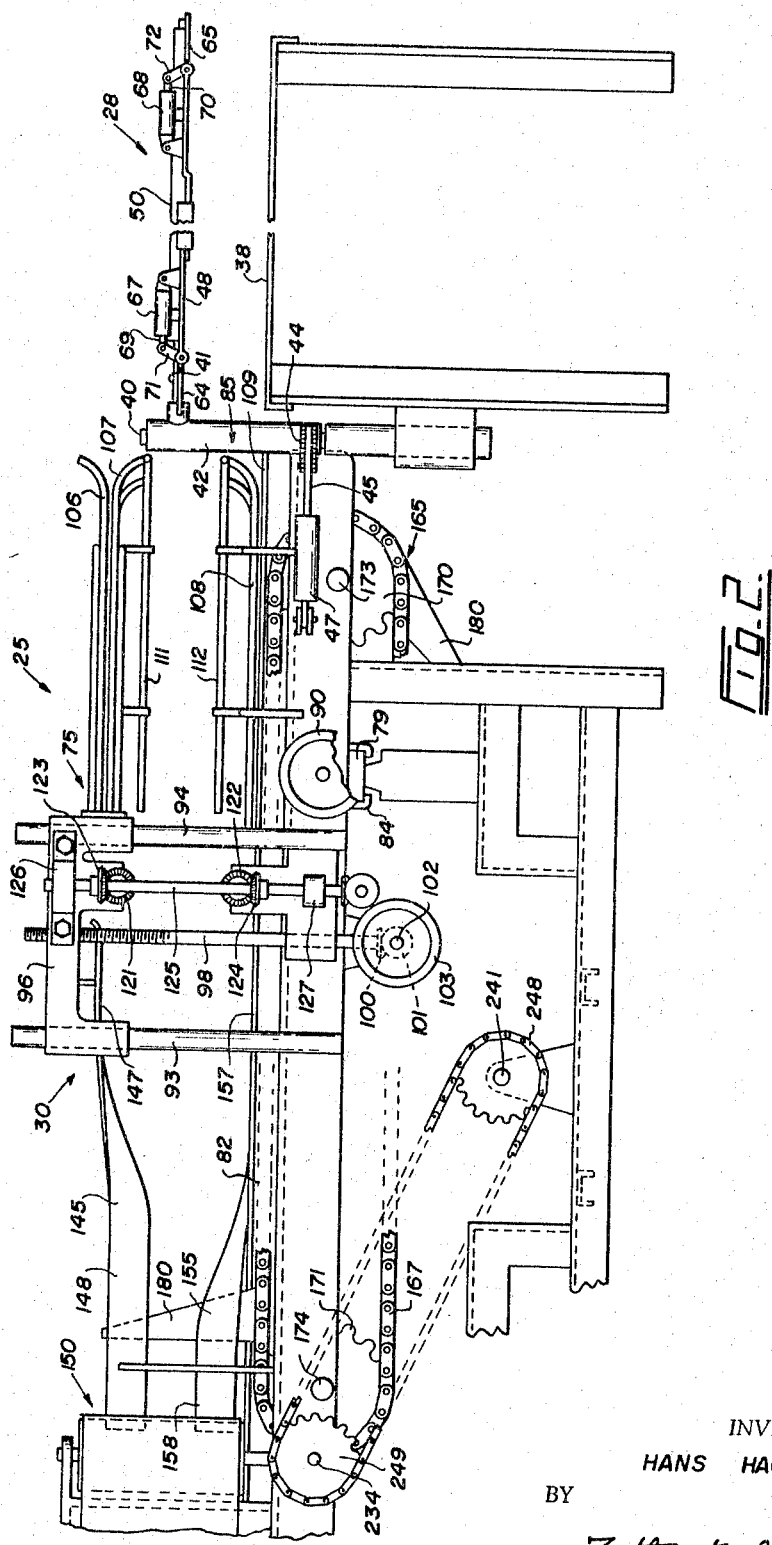

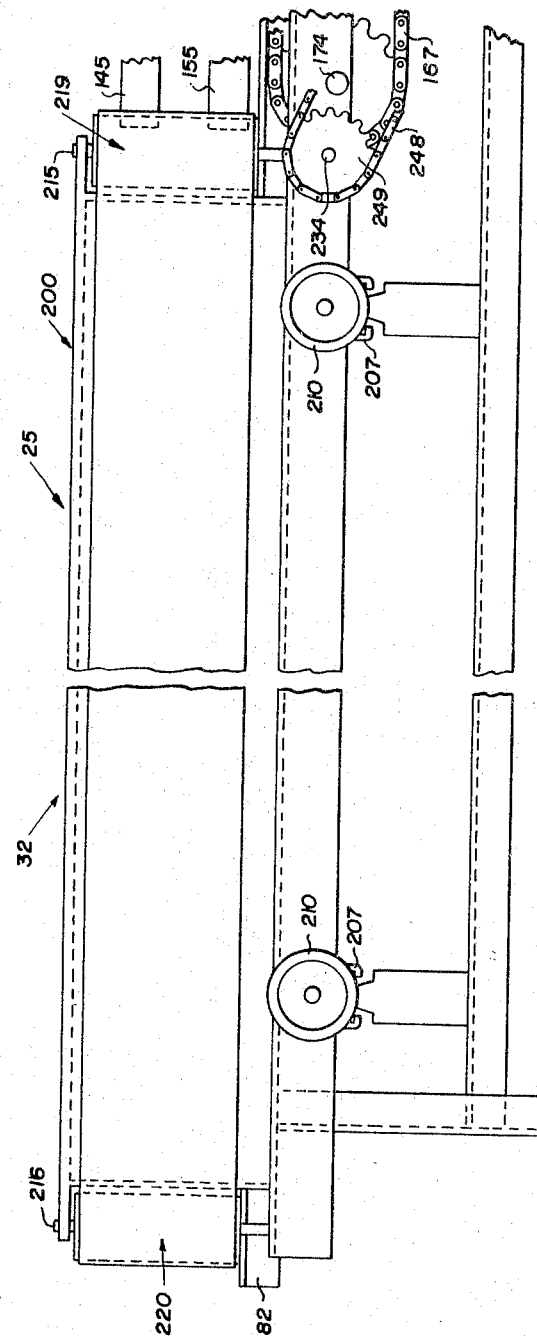

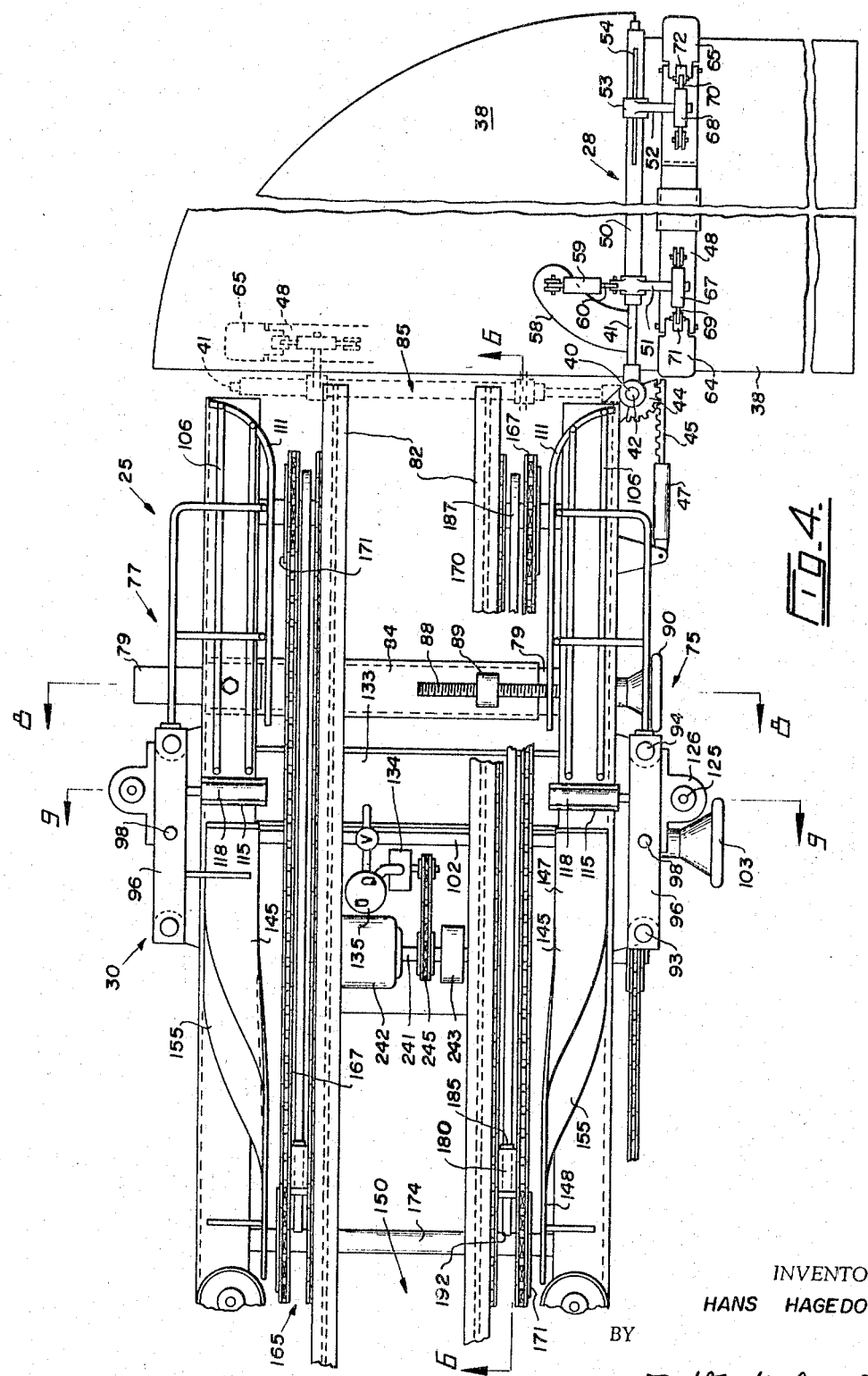

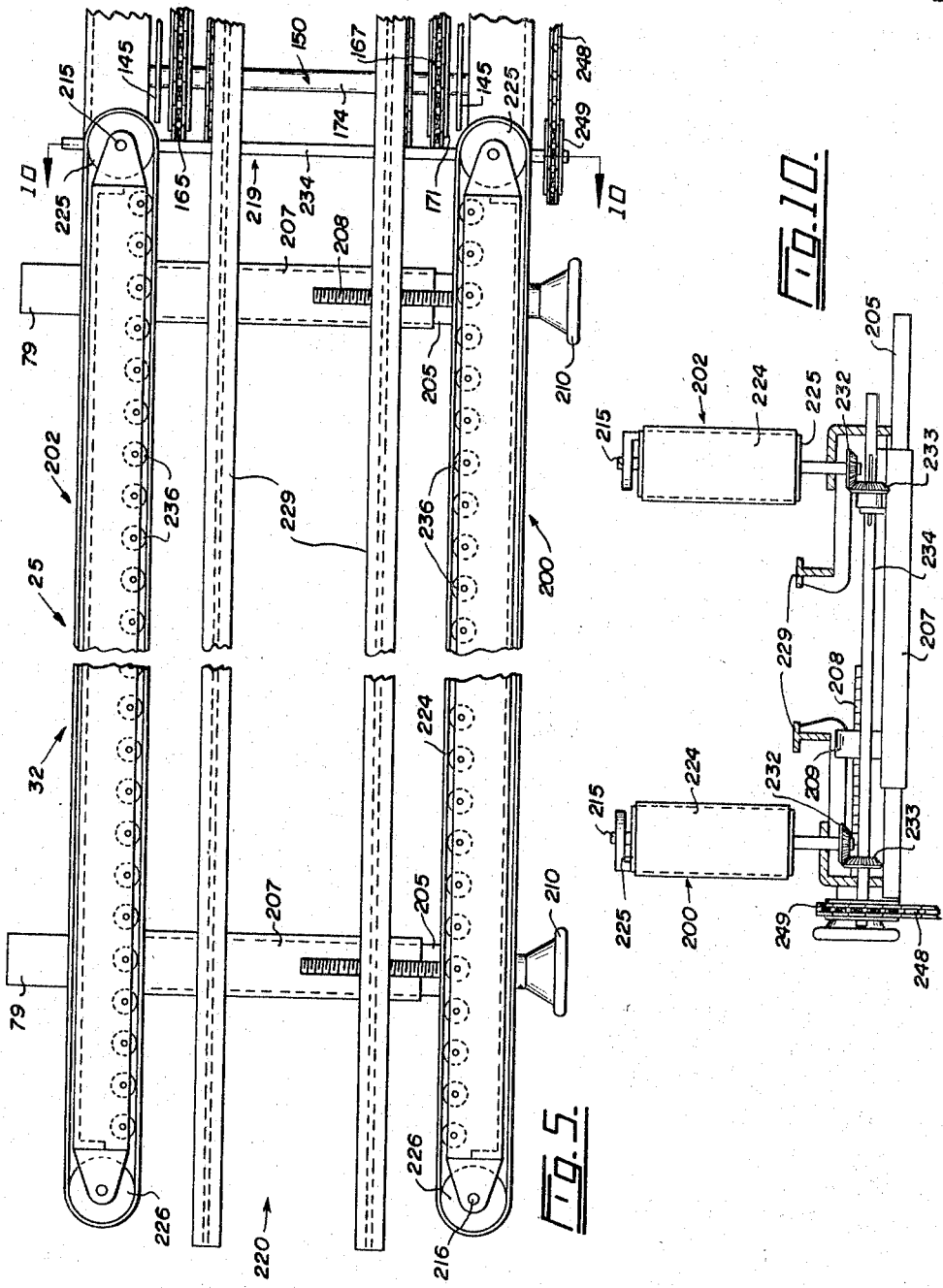

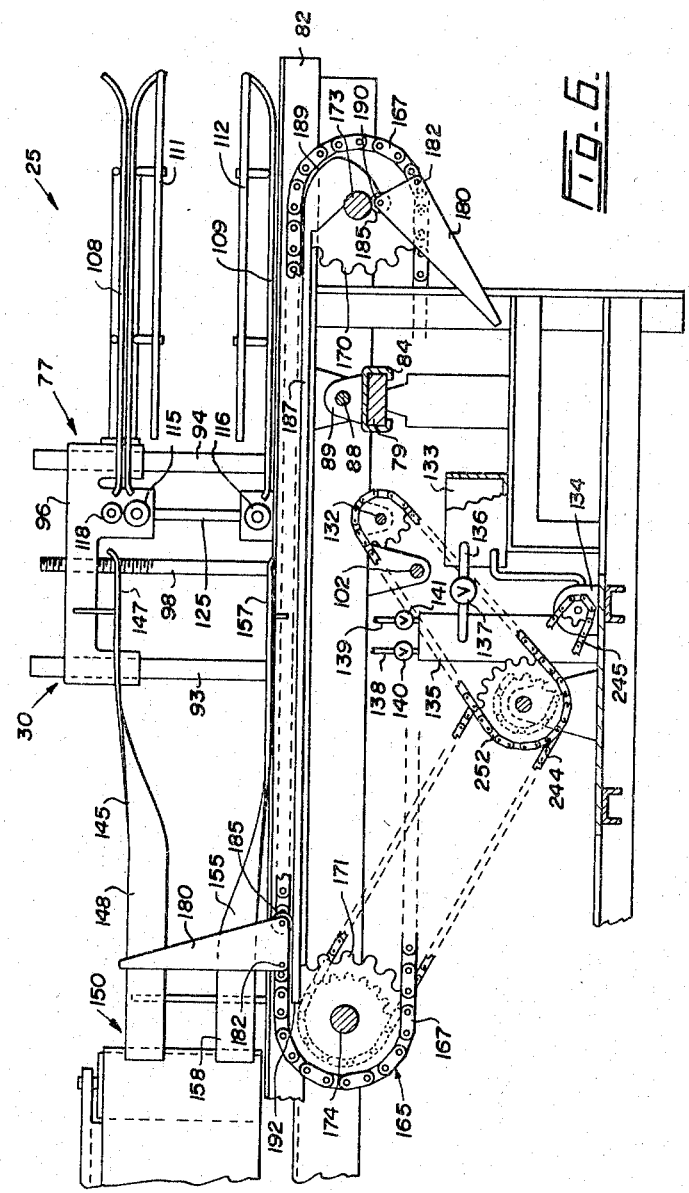

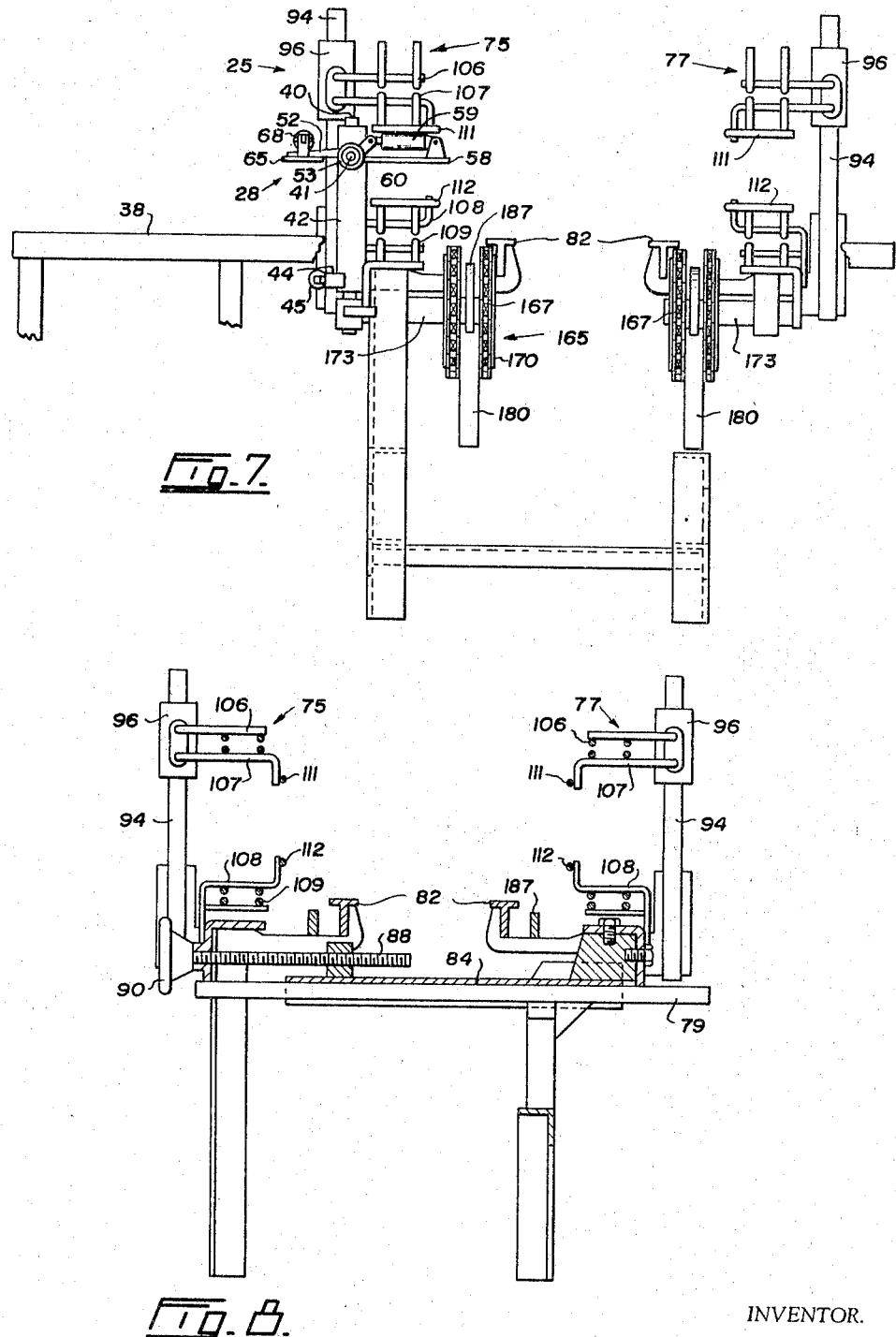

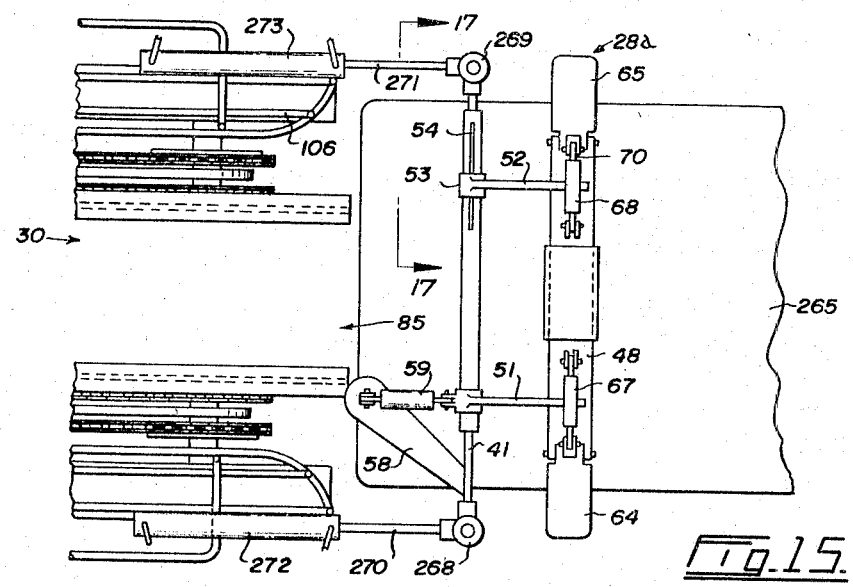
Fig. 15.
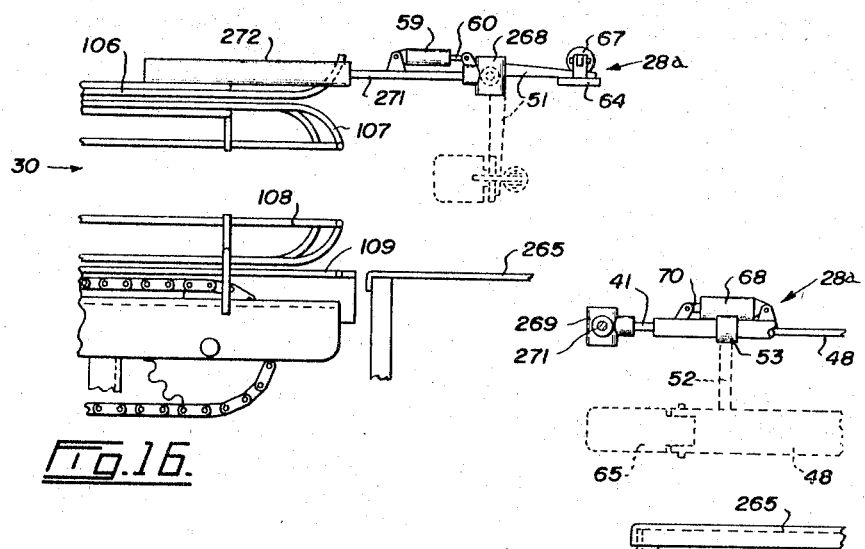
Fig. 16.
Fig. 17.
INVENTOR
HANS HAGEDORN
BY
Fetherstonhaugh & Co.
ATTORNEYS

United States Patent Office 3,323,285
Patented June 6, 1967

3,323,285
CARTON CLOSING AND SEALING APPARATUS
Hans Hagedorn, North Vancouver, British Columbia, Canada, assignor to Industrial Development Bank, Vancouver, British Columbia, Canada
Filed June 29, 1964, Ser. No. 378,684
17 Claims. (Cl. 53—374)

This invention relates to apparatus for closing and sealing end-loading cartons.

There is a need today for apparatus for automatically closing and sealing end-loading cartons. It is difficult to do this completely by machine, and as a result, end-loading cartons have been partially or completely closed and sealed by hand.

An object of the present invention is the provision of apparatus for automatically closing and sealing end-loading cartons without the necessity of any manual manipulation once the operation has begun.

Another object is the provision of carton closing and sealing apparatus which may be used to close and seal one end only of a carton, or both ends, which may be easily adjusted to accommodate cartons of different dimensions, and which may be used to fold end flaps inwardly when the outer flaps meet centrally of the carton end or when one of said outer flaps partially or completely overlaps the other outer flap.

Apparatus according to the present invention is adapted to close and seal an end-loading carton having a four-walled casing which is horizontal as it passes through the apparatus, a pair of vertical opposed flaps and a pair of opposed horizontal flaps on at least one end thereof to be folded inwardly to close the end, said vertical flaps being considered forward and rear flaps with reference to the direction of movement of the casing. This apparatus comprises conveying means for moving the casing through the apparatus with said casing extending transversely of the direction of movement, folding means for folding the rear and forward vertical flaps over the adjacent casing end, glue applicators for applying glue to inner surfaces of the horizontal flaps, folding means for folding the horizontal flaps inwardly over the folded vertical flaps, and means pressing said horizontal flaps inwardly against the vertical flaps until they adhere to said vertical flaps.

Two examples of machines made in accordance with the present invention are illustrated in the accompanying drawings, in which:

FIGURE 1 is a perspective view of an end-loading carton before being closed and sealed;

FIGURES 2 and 3 are a side elevation of the apparatus of one embodiment of the invention;

FIGURES 4 and 5 are plan views of the apparatus shown in FIGURES 2 and 3 respectively;

FIGURE 6 is a longitudinal section taken on the line 6—6 of FIGURE 3;

FIGURE 7 is an elevation of the entrance end of the apparatus, with part of the infeed table removed;

FIGURE 8 is a cross section taken on the line 8—8 of FIGURE 4;

FIGURE 9 is a cross section taken on the line 9—9 of FIGURE 4;

FIGURE 10 is a cross section taken on the line 10—10 of FIGURE 5;

FIGURE 11 is a fragmentary vertical section taken on the line 11—11 of FIGURE 8;

FIGURE 12 is a plan view of the apparatus shown in FIGURE 11;

Figure 13:
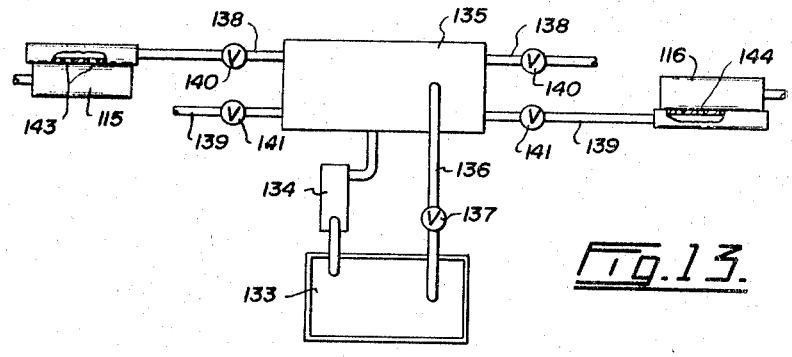
Figure 14:
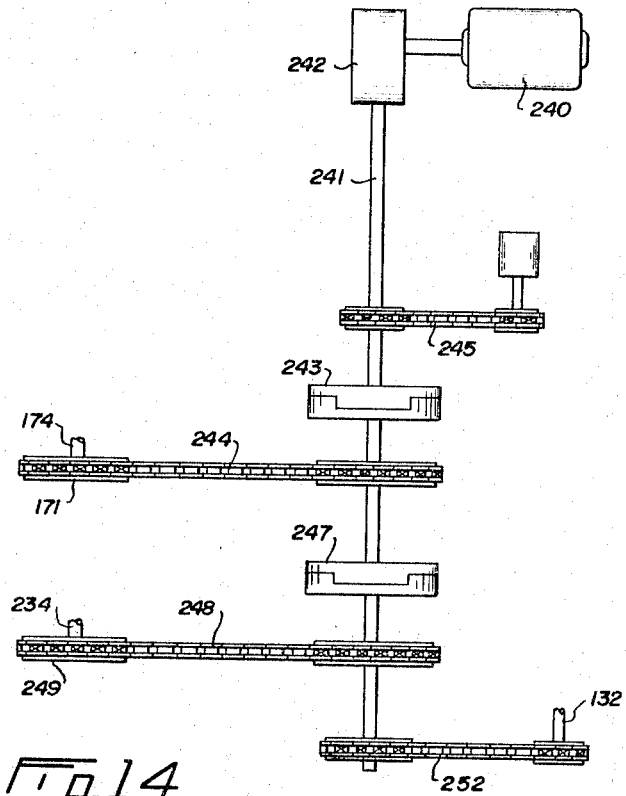

FIGURE 13 diagrammatically illustrates the glue system of this apparatus;

FIGURE 14 diagrammatically illustrates the drive system of this apparatus;

FIGURE 15 is a plan view of an alternative form of apparatus for folding in the rear vertical flaps of the cartons;

FIGURE 16 is a side elevation of the apparatus of FIGURE 15; and

FIGURE 17 is a cross section taken on the line 17—17 of FIGURE 15.

Referring to FIGURE 1 of the drawings, 10 is an end loading carton comprising a four-walled casing 11 with the same flap arrangement at each end. Each flap arrangement includes opposed end wall flaps 14 and 15, and opposed side wall flaps 16 and 17. Carton 10 is loaded through either or both ends while lying in a horizontal position. As a result of this, casing 11 is moved through the closing and sealing apparatus in the direction of arrow 18 while in a horizontal position, flaps 14 and 15 being vertical flaps with the former a forward flap and the latter a rear flap with reference to the direction of movement of the carton, and flaps 16 and 17 being upper and lower horizontal flaps.

The closing and sealing apparatus illustrated herein is designed to close flaps at both ends of the carton, but as the operation is exactly the same, the action at one end only of the carton will be described in detail.

When carton 10 travels through the closing and sealing apparatus, rear flap 15 is folded inwardly followed by the infolding of forward flap 14. Then a suitable glue is applied to the inner surfaces of upper and lower flaps 16 and 17, after which said flaps are folded over the forward and rear flaps. Pressure is applied to the end of the cartons until the glue has at least partially set, after which the carton is moved out of the apparatus.

FIGURES 2 to 12 illustrate apparatus 25 for closing and sealing carton 10. This apparatus includes a rear flap folding section 28; a main section 30 in which the forward flap is folded inwardly, glue is applied to the inner surfaces of the upper and lower flap, and the latter flaps folded inwardly; and a sealing section 32 in which the inner flaps are pressed until the glue at least partially sets. Sections 28 and 30 are shown in FIGURES 2, 4, 6 to 9, 11 and 12, while section 32 is shown in FIGURES 3, 5 and 10.

Folding section

Carton 10 is fed to section 28 either by hand or automatic means, not shown. This section, shown in FIGURES 2, 4 and 7, includes a table 38 over which the carton is moved. In apparatus 25, table 38 extends outwardly substantially at right angles to main section 30, but if desired, this table may be aligned with the main section. A vertical post 40 is located to one side of table 38 near the end of main section 30, and a rod 41 is rotatably mounted at one end on this post by means of a suitable sleeve 42. Rod 41 is spaced above table 38 and normally extends across said table. Suitable means is provided for swinging rod 41 from its normal position around post 40 to a position extending across the end of main section 30, as indicated in broken lines in FIGURE 4. In this example, a segment 44 is fixedly secured to sleeve 42 and meshes with a rack 45 which is moved back and forth by an air cylinder 47. When rack 45 is moved outwardly of the cylinder, rod 41 is swung across the end of section 30, and when said rack is moved in the opposite direction, rod 41 is moved back to its normal position extending across table 38.

A longitudinally extensible bar 48 is carried by rod 41. Bar 48 normally lies in a horizontal plane spaced above table 38 and it is movable towards said table into a vertical position. A sleeve 50 is rotatably mounted on rod 41, and one end of bar 48 is fixedly secured to said sleeve by an arm 51, while the opposite end of said bar is connected by another arm 52 to a bearing 53 which rotates with sleeve 50 but is adjustable longitudinally thereof, said bearing having a key, not shown, fitting into a slot 54 formed in sleeve 50.

A supporting plate 58 is carried by rod 41 near arm 51. An air cylinder 59 mounted on plate 58 has a piston rod 60 connected at its outer end to a projection 61 extending upwardly from arm 51 at the end thereof remote from bar 48. When piston rod 60 is extended, arm 51 is swung downwardly to move bar 48 into its vertical position above the surface of table 38, and when said piston rod is retracted, bar 48 is swung into its horizontal position.

Folding plates 64 and 65 are swingably mounted on the opposite ends of bar 48. The folding plates normally extend in substantially the same plane as bar 48, but when said bar is swung down to its vertical position, plates 64 and 65 are then swung inwardly into positions substantially normal to said bar. This is accomplished by air cylinders 67 and 68 connected by piston rods 69 and 70 to lugs 71 and 72 projecting from the inner end of plates 64 and 65. When piston rods 69 and 70 are retracted, plates 64 and 65 are in their normal extended positions, and when said piston rods are extended, the folding plates are in their inner positions normal to bar 48.

When carton 10 is moved over table 38 to a predetermined position beneath rod 41, it operates a microswitch, not shown, which actuates cylinder 59 to swing bar 48 downwardly behind the carton. When bar 48 reaches its vertical position, it trips another microswitch, not shown, to actuate cylinders 67 and 68 to swing folding plates 64 and 65 inwardly over the carton ends. This folds the rear flaps 15 of the carton inwardly over their respective carton ends. As said folding plates 64 and 65 swing inwardly, one of them trips another microswitch, not shown, to cause cylinder 47 to swing rod 41 around post 40 into a position across the end of main section 30. This action moves carton 10 over table 38 and into said main section. When rod 41 reaches the position extending across the main section, it trips a microswitch, not shown, to cause cylinder 47 to swing the rod back to its normal position, cylinders 67 and 68 to swing plates 64 and 65 into line with bar 48, and cylinder 59 to swing said bar back to its normal horizontal position.

*Main section*

Main section 30 comprises substantially identical, parallel side sections 75 and 77. Section 75 is fixedly mounted on the framework of the machine, while section 77 is slidably mounted upon a plurality of transverse bars 79 for movement towards and away from section 75. This allows for the adjustment of the machine to accommodate cartons of different sizes. Sections 75 and 77 have parallel tracks 82, respectively, extending along main section 30 at the level of table 38 of flap folding section 28, said tracks supporting each carton as it is moved to the main section. A slide 84 is movably mounted on one of the bars 79 spaced inwardly from the entrance end 85 of section 30, see FIGURES 4 and 6. This slide is secured to side section 77, and a threaded shaft 88 is rotatably carried by side section 75 and is threaded through a nut 89 fixedly mounted on slide 84. A hand wheel 90 is fixedly secured to the outer end of shaft 88 so that when said hand wheel is turned, slide 84 and consequently side section 77 is moved towards or away from side section 75.

As side sections 75 and 77 are practically identical, section 75 only will now be described in detail.

A pair of guide bars 93 and 94 are secured to and project upwardly from side section 75 substantially midway between the ends of said section, see FIGURES 2, 4 and 6. A head 96 is slidably mounted on guide bars 93 and 94, and is moved up and down on said bars by a threaded shaft 98 which is threaded at its upper end through head 96 and is rotatably mounted at its lower end in side section 75. A bevel gear 100 fixedly mounted on the lower end of shaft 98 meshes with another bevel gear 101 mounted on a transverse shaft 102 extending across section 30, said shaft having a hand wheel 103 fixedly secured to its outer end at side section 75. Shaft 102 is rotatably mounted in side section 75, and is slidably and rotatably mounted in side section 77. The bevel gear 101 at the end of shaft 102 in side section 77 is slidably mounted on slide 84. A hand wheel 90 is fixedly secured 103 is turned, the heads 96 of sections 75 and 77 are simultaneously raised or lowered.

A pair of spaced upper horizontal guides 106 and 107 and a pair of spaced lower horizontal guides 108 and 109 are mounted on side section 75 and head 96, respectively, and extend to the entrance end 85 of the main section. Vertical guides 111 and 112 extend along beside horizontal guides 106–107 and 108–109 respectively.

Upper and lower glue applicator rollers 115 and 116 are rotatably carried by head 96 and side section 75 respectively, and project inwardly therefrom, see FIGURES 6, 8, 11 and 12. Idler rollers 118 and 119 carried by head 96 and section 75 are spaced respectively above roller 115 and below roller 116. Rollers 115 and 116 are rotated by bevel gears 121 and 122 which mesh with gears 123 and 124 on a vertical shaft 125 journalled in bearings 126 and 127 on head 96 and side section 75. Gear 123 is movable on and keyed to shaft 125, while gear 124 is fixedly mounted on said shaft. A bevel gear 130 fixedly mounted on the lower end of shaft 125 meshes with another bevel gear 131 fixedly mounted on a transverse shaft 132. Said shaft 132 is rotatably mounted in side sections 75 and 77, and it carries the bevel gear 131 of the driving arrangement for the upper and lower glue applicator rollers of the latter side section.

FIGURES 8, 11, 12 and 13 show the system for supplying glue to the applicator rollers 115 and 116. An open-topped reservoir 133 is mounted directly beneath rollers 115 and 116 on opposite sides of the apparatus. A pump 134 directs glue from the reservoir to a closed tank 135, and a by-pass pipe 136 extends back to the reservoir, said pipe having a pressure control valve 137 therein which prevents the pressure in tank 135 from rising above a predetermined level. A pair of pipes 138 and 139 with valves 140 and 141 therein extend from tank 135 to rollers 115 and 116 respectively at each side of the apparatus. Pipe 138 extends over a pad 142 which extends longitudinally of roller 115 and is tilted towards and bears against said roller. This pipe has a plurality of holes 143 therein over pad 142 and facing roller 115. Pipe 139 also has holes 144 therein near its outer end, said pipe extending over a pad, not shown, similar to pad 142 and bearing against lower roller 116.

With this arrangement, pump 134 directs glue from reservoir 133 into tank 135, and said glue is conveyed by pipes 138 and 139 to upper and lower rollers 115 and 116 at opposite sides of the machine.

Head 96 carries an upper folding plate 145 which is substantially aligned with upper horizontal guides 106–107 but projects outwardly from said head from the side thereof opposite said horizontal guide. Plate 145 has a horizontal section 147 at head 96 and is bent downwardly into a vertical section 148 towards the discharge end 150 of main section 30.

A lower folding plate 155 is mounted on side section 75 beneath and substantially parallel with upper folding plate 145. Plate 155 has a horizontal section 157 and is bent into a vertical section 158. Horizontal and vertical sections 157 and 158 are respectively located beneath horizontal and vertical sections 147 and 148 of upper folding plate 145. The two vertical sections 148 and 158 may be co-extensive, but it is preferable to start the upper vertical section 148 before the lower vertical section 158, that is, the beginning of the upper vertical section is closer to the glue applicator rollers 115 and 116 than is the beginning of the lower vertical section.

A conveyor 165 is provided in and extends longitudinally of main section 30 from its entrance end 85 to its discharge end 150. This conveyor comprises identical chains 167 carried by side section 75 and 77. Chain 167 of side section 75 extends around sprockets 170 and 171 carried respectively by a stub shaft 173 and a transverse shaft 174. Stub shaft 173 is carried by and projects inwardly from side section 75 near the entrance end 85, while transverse shaft 174 extends between and is carried by the side sections 75 and 77. Section 77 is movably mounted on shaft 174, while the sprocket 171 of the latter side section is slidably mounted on the keyed to said transverse shaft. One or more collapsible fingers 180 is or are carried by each chain 167. In this example, there are two fingers on each chain 167. Each illustrated finger 180 is substantially triangular in shape, see FIGURE 6, and is swingably connected at its lower end at 182 to chain 167. A roller 185 is carried by finger 180 at the base thereof and spaced from its pivot 182, said roller projecting laterally from said base. This roller is adapted to ride on a guide track 187 which is carried by side section 75 below the level of track 82 of said side. Track 187 has a downwardly curved section 189 at the entrance end 85 of main section 30, said curved section terminating in a shoulder 190 beneath the main portion of track 187. This track has an opposite end 192 spaced a little from main section discharge end 150.

As each finger 180 is moved horizontally through main section 30, its roller 185 rides on track 187 to keep said finger in a vertical position. When roller 185 runs off the end 192 of the guide track, finger 180 collapses rearwardly. As the collapsed finger travels towards the entrance end of the main section, it hangs down from chain 167, and when the chain moves around sprocket 170 roller 185 engages shoulder 190, and the finger is swung around so that said roller rides on the curved section 189 of the guide track. This curved section is so arranged that by the time the lower end of the finger reaches the upper horizontal run of chain 167, said finger is swung back into the vertical position.

*Sealing section*

Sealing section 32 comprises spaced parallel identical side sections 200 and 202. Section 202 is slidably mounted on a plurality of bars 205 which are fixedly secured to and project inwardly from side section 200. A slide 207 is slidably mounted on each bar 205 and is connected to side section 202. A threaded shaft 208 is threaded in a nut 209 fixedly secured to slide 207, said shaft being journalled in section 200. A hand wheel 210 is fixedly mounted on the outer end of each shaft 208. Thus, when hand wheels 210 are turned, side section 202 is moved towards or away from side section 200.

Vertical shafts 215 and 216 are mounted at the entrance end 219 and discharge end 220 of sealing section 32. An endless belt 224 extends around rollers 225 and 226 fixedly mounted on shafts 215 and 216 respectively. A track 229 is carried by side section 200 inwardly thereof substantially in line with track 82 of side section 75 of main section 30. As side section 202 is identical with section 200, the former section also carries a track 229.

Shaft 215 extends downwardly below the level of tracks 229, and has a bevel gear 232 fixedly mounted on its lower end meshing with another bevel gear 233 fixedly mounted on a transverse shaft 234 which is journalled at one end on section 200 and at its opposite end on section 202. This transverse shaft forms a drive for the endless belt 224 of the two side sections 200 and 202. The bevel gear 233 of section 202 is slidably mounted on and keyed to shaft 234. This gear moves along shaft 234 when section 202 is shifted towards and away from section 200.

A plurality of vertically-arranged rollers 236 are positioned against the inner surface of the inner run of each belt 224, see FIGURE 5, to provide a backing for said run.

The driving system for this apparatus is diagrammatically illustrated in FIGURE 14. An electric motor 240 turns a drive shaft 241 through a gear reduction unit 242. A chain 245 extending around sprockets on shaft 241 and the shaft of glue pump 134 drives said pump. An electric clutch 243 selectively connects the sprocket of a chain 244 to shaft 241. Chain 244 also extends around sprocket 171 of shaft 174 to drive the conveyor of main section 30. Another electric clutch 247 selectively connects the drive shaft to a sprocket around which a chin 248 extends. This chain also extends around a sprocket 249 fixedly secured on shaft 234 of sealing section 32 to drive belts 224. Another chain 252 extends around a sprocket on drive shaft 241 and another sprocket on shaft 132 to drive the glue applicator rollers 115 and 116.

*Operation*

A carton 10 is delivered either manually or automatically to table 38 of the rear flap folding section 28. The carton is moved beneath rod 41, and when it gets in a predetermined position, it trips a micro switch to cause bar 48 to swing down behind it. When this takes place, folding plates 64 and 65 are swung inwardly to fold the carton rear flaps 15 over the adjacent ends of the carton. Then rod 41 is swung around post 40 to shift the carton along table 38 into the entrance 85 of main section 30 and on the conveyor 165 of said section. The carton is moved far enough into the main section that vertical guides 112 hold rear flaps 15 in position against the carton ends. As said carton is moved into the main section, said vertical guides 111 and 112 swing the forward flaps 14 inwardly over the carton ends.

When the carton reaches a predetermined position in main section 30, rod 41, bar 48 and folding plates 64 and 65 are swung back to their normal positions ready for the next carton. At the same time, the carton in the main secion trips a microswitch which starts conveyor 165 moving. A pair of fingers 180 on chains 167 of said conveyor press against casing 11 of the carton to move the latter forwardly through the main section. At this time, horizontal flaps 16 and 17 move between horizontal guides 106–107 and 108–109 respectively, which direct them respectively between rollers 115–118 and 116–119, see FIGURE 8. Rollers 115 and 116 apply glue to the inner surfaces of said horizontal flaps. As the carton progresses through the main section, the outer surfaces of upper and lower flaps 16 and 17 move over the inner surfaces of the horizontal sections 147 and 157 of folding plates 145 and 155. The vertical section 148 of the upper folding plate swings upper flap 16 downwardly over the carton end, and the vertical section 158 of the lower folding plate folds lower flap 17 upwardly over the carton end. The conveyor fingers 180 move the carton through entrance end 219 of the sealing section 32. Belts 224 move faster than conveyor 165 so that as soon as the carton is gripped by said belts, it is drawn forwardly off the conveyor. At the same time, rollers 185 of fingers 180 run off guide tracks 187 so that said fingers collapse and move beneath the carton. When said carton reaches a predetermined position in sealing section 132, it trips a microswitch, not shown, to stop belts 224 and conveyor 165. At this time, a pair of fingers 180 are positioned near the entrance end 85 of main section 30. After a predetermined interval, a time switch, not shown, starts endless belts 224 moving to shift the carton through and out of sealing section 32. The carton stands in said section sufficiently to enable the glue on the end flaps at least to partially set, and by the time the carton reaches the end of section 32, the end flaps are firmly held in position.

Conveyor 165 and belts 224 move independently of each other so that a carton can be moving through main section 30 while the previous carton is stationary in sealing section 32.

*Alternative folding section*

FIGURES 15 to 17 illustrate an alternative flap folding section 28a which includes a table 265 over which each carton 10 is moved. The cartons are fed to this section either by hand or by automatic means, not shown. Table 28a is aligned with main section 30. Rod 41 and the parts carried thereby are mounted above table 265 at the entrance 85 of main section 30. In this embodiment, rod 41 is carried by supports 268 and 269 at opposite ends thereof, said supports in turn being carried by piston rods 270 and 271 projecting respectively from pneumatic cylinders 272 and 273. These cylinders extend longitudinally of the apparatus and are mounted on the outer parts of the upper horizontal guides 106–107 at the opposite sides of main section 30.

When section 28a is ready to receive a carton, piston rods 270 and 271 are extended, and bar 48 is lying in a horizontal plane. When a carton 10 is moved over table 265 to a predetermined position beneath rod 41, it operates a microswitch, not shown, which actuates cylinder 59 to swing bar 48 downwardly behind the carton. As this bar reaches its vertical position, it trips another microswitch, not shown, to actuate cylinders 67 and 68 to swing the folding plates 64 and 65 inwardly over the carton ends to fold the rear flaps of said carton inwardly. As plates 64 and 65 swing inwardly, another microswitch, not shown, is tripped to cause cylinders 272 and 273 to retract their respective piston rods thereby moving rod 41 towards the entrance 85 of main section 30 to move the carton into said main section. Another microswitch, not shown, is tripped to cause cylinders 272 and 273 to return rod 41 to its normal position, and to cause cylinders 67 and 68 to swing plates 64 and 65 into line with bar 48, and cylinder 59 to swing said bar back to its normal horizontal position. Thus, folding section 28a feeds the cartons 10 straight into main section 30, whereas section 28 swings the cartons around a 90° turn while feeding them into said main section.

What I claim as my invention is:

1. Apparatus for closing and sealing an end-loading carton having a four-walled horizontal casing with a pair of opposed vertical flaps and a pair of opposed horizontal flaps on at least one end thereof to be folded inwardly to close said end, said vertical flaps being forward and rear flaps with reference to the direction of movement of the casing, said apparatus comprising a support over which the carton is to be moved with the casing extending transversely of the direction of movement through the apparatus, conveying means for receiving the carton from the support, moving means adapted to be shifted to a position behind the casing and to move the latter on to the conveying means, first folders on said moving means for folding the rear flaps over the adjacent casing end, second folders beside the conveying means for folding the forward flaps over the casing end as the casing is moved past said second folders, glue applicators for applying glue to inner surfaces of the horizontal flaps, folding means for folding the horizontal flaps inwardly over the folded vertical flaps, and means pressing said horizontal flaps inwardly against the vertical flaps until they adhere to said vertical flaps.

2. Apparatus for closing and sealing an end-loading carton having a four-walled horizontal casing with a pair of opposed vertical flaps and a pair of opposed horizontal flaps on at least one end thereof to be folded inwardly to close said end, said vertical flaps being forward and rear flaps with reference to the direction of movement of the casing, said apparatus comprising conveying means for moving the casing through the apparatus with said casing extending transversely of the direction of movement, said conveying means having a collapsible lug normally projecting therefrom to engage and move the carton with the conveying means, folding means for folding the rear and forward vertical flaps over the adjacent casing end, glue applicators for applying glue to inner surfaces of the horizontal flaps, folding means for folding the horizontal flaps inwardly over the folded vertical flaps, a pair of laterally-spaced vertical and horizontal movable belts positioned to receive the casing from said conveying means, said belts being spaced laterally to exert pressure on the ends of casing therebetween, said belts normally being stationary and the casing being forced therebetween by the conveying means lug, means for disengaging said lug to permit the latter to collapse when the carton is fully positioned between the belts, power means operatively connected to said belts, and control means causing the power means to operate to move the belts and shift the casing away from the conveying means after said casing has been positioned between the belts for a predetermined time.

3. Apparatus for closing and sealing an end-loading carton having a four-walled horizontal casing with a pair of opposed vertical flaps and a pair of opposed horizontal flaps on at least one end thereof to be folded inwardly to close said end, said vertical flaps being forward and rear flaps with reference to the direction of movement of the casing, said apparatus comprising conveying means for moving the casing through the apparatus with said casing extending transversely of the direction of movement, folding means for folding the rear and forward vertical flaps over the adjacent casing end; said means for folding the rear vertical flaps over the adjacent casing ends comprising a bar normally spaced vertically from the path of travel of the casings, means for swinging said bar behind a casing, a folding plate swingably mounted on at least one end of the said bar and normally aligned therewith, and means carried by the bar for swinging the folding plate towards an end of the casing to swing the adjacent rear vertical flap over said end; glue applicators for applying glue to inner surfaces of the horizontal flaps, folding means for folding the horizontal flaps inwardly over the folded vertical flaps, and means pressing said horizontal flaps inwardly against the vertical flaps until they adhere to said vertical flaps.

4. Apparatus for closing and sealing an end-loading carton having a four-walled horizontal casing with a pair of opposed vertical flaps and a pair of opposed horizontal flaps on at least one end thereof to be folded inwardly to close said end, said vertical flaps being forward and rear flaps with reference to the direction of movement of the casing, said apparatus comprising conveying means for moving the casing through the apparatus with said casing extending transversely of the direction of movement, folding means for folding the rear and forward vertical flaps over the adjacent casing end; said means for folding the rear vertical flaps over the adjacent casing ends comprising an extensible bar normally spaced vertically from the path of travel of the casings, means for swinging said bar behind a casing, a folding plate swingably mounted on each end of said bar and normally aligned therewith, and means carried by the bar for swinging each folding plate towards an end of the casing to swing the adjacent rear vertical flap over said end; glue applicators for applying glue to inner surfaces of the horizontal flaps, folding means for folding the horizontal flaps inwardly over the folded vertical flaps, and means pressing said horizontal flaps inwardly against the vertical flaps until they adhere to said vertical flaps.

5. Apparatus as claimed in claim 1 in which the moving means and first folders comprise a bar normally spaced vertically from the support, means for swinging said bar behind a casing on the support, a folding plate swingably mounted on at least one end of said bar and normally aligned therewith, means carried by the bar for swinging the folding plate towards an end of the casing to swing the adjacent rear vertical flap over said end, and means connected to the bar for moving said bar to shift the casing ahead thereof on to the conveying means.

6. Apparatus as claimed in claim 1 in which the moving means and first folders comprise an extensible bar normally spaced vertically from the support, means for swinging said bar behind a casing on the support, a folding plate swingably mounted on each end of said bar and normally aligned therewith, means carried by the bar for swinging each folding plate towards an end of the casing to swing the adjacent rear vertical flap over said end, and means connected to the bar for moving said bar to shift the casing ahead thereof on to the conveying means.

7. Apparatus as claimed in claim 1 in which the second folders comprise guides extending along the opposite sides of the conveying means positioned to swing the forward vertical flaps inwardly over the adjacent casing ends as said casing is moved on to said conveying means.

8. Apparatus as claimed in claim 1 in which the moving means and first folders comprise a bar normally spaced vertically from the support, means for swinging said bar behind a casing on the support, a folding plate swingably mounted on at least one end of said bar and normally aligned therewith, means carried by the bar for swinging the folding plate towards an end of the casing to swing the adjacent rear vertical flap over said end, and means connected to the bar for moving said bar to shift the casing ahead thereof on to the conveying means; and the second folders comprise guides extending along the opposite sides of the conveying means positioned to swing the forward vertical flaps inwardly over the adjacent casing ends as said casing is moved on to said conveying means.

9. Apparatus as claimed in claim 1 in which the glue applicators comprising a horizontal roller positioned to bear against the inner surface of each horizontal flap, means for rotating each roller, a pad extending along and bearing against each roller, each pad being inclined towards the roller against which it bears, and means for supplying glue to an upper surface of each pad, the glue on each pad flowing on to the adjacent roller.

10. Apparatus as claimed in claim 9 in which the means for supplying glue to roller pads comprises an open-topped reservoir positioned beneath the rollers, a closed pressure tank, pump means for directing glue from the reservoir to the tank to maintain a predetermined pressure in said tank, and pipe means extending from the tank and extending over each pad, said pipe means having outlets over the pads to permit glue to flow on to the latter.

11. Apparatus as claimed in claim 1 in which the folding means for the horizontal flaps comprises upper and lower folding plates extending along opposite sides of the conveying means, each plate including a horizontal section having an inner surface along which a horizontal flap moves, and each plate twisting into a vertical section to swing the flap against the adjacent casing end.

12. Apparatus as claimed in claim 11 in which one of the upper and lower folding plates is located ahead of the other with reference to the direction of movement of the casings.

13. Apparatus as claimed in claim 1 in which the pressing means comprises a pair of parallel endless belts arranged to travel around vertical axes and positioned to receive the casings from the folding means, said belts being spaced apart sufficiently firmly to grip each casing moved therebetween, means operatively connected to said belts to move the latter around said vertical axes, and support means between the belts over which the casings are moved by said belts.

14. Apparatus as claimed in claim 13 in which the belts travel faster than the conveying means.

15. Apparatus as claimed in claim 13 including means for periodically stopping the belts to permit the glue on the casing flaps to set.

16. Apparatus as claimed in claim 1 in which the conveying means comprises an endless conveyor, at least one finger swingably mounted on the conveyor, means for keeping the finger projecting upwardly from said conveyor as said finger moves a casing through the forward flap folding means, the glue applicators and the horizontal flap folding means, said finger collapsing as the casing is moved into the pressing means, and means for returning the finger to a position projecting outwardly from the conveyor.

17. Apparatus for closing and sealing an end-loading carton having a four-walled horizontal casing with a pair of opposed vertical flaps and a pair of opposed horizontal flaps on both ends thereof to be folded inwardly to close said ends, said vertical flaps being forward and rear flaps with reference to the direction of movement of the casing, said apparatus comprising a support over which the carton is to be moved with the casing extending transversely of the direction of movement through the apparatus, conveying means for receiving the carton from the support, moving means adapted to be shifted to a position behind the casing and to move the latter on to the conveying means, first folders on said moving means for folding the rear flaps over the adjacent casing ends and pressing said rear flaps against said ends, said first folders while pressing the rear flaps against the casing ends aligning the casing with the conveying means, second folders beside the conveying means for folding the forward flaps over the casing ends as the casing is moved past said second folders, glue applicators for applying glue to the inner surface of at least one horizontal flap at each casing end, folding means for folding the horizontal flaps inwardly over the folded vertical flaps, and means pressing said horizontal flaps inwardly against the vertical flaps until they adhere to said vertical flaps.

References Cited

UNITED STATES PATENTS

| | | | |
|---|---|---|---|
| 1,844,661 | 2/1932 | Kimball et al. | 53—374 |
| 2,390,107 | 12/1945 | Kucklinsky | 53—374 |
| 3,060,659 | 10/1962 | Blais et al. | 53—374 X |

TRAVIS S. McGEHEE, Primary Examiner.